US007860859B2

(12) United States Patent
Haugen et al.

(10) Patent No.: US 7,860,859 B2
(45) Date of Patent: Dec. 28, 2010

(54) DETERMINING SEARCH QUERY STATISTICAL DATA FOR AN ADVERTISING CAMPAIGN BASED ON USER-SELECTED CRITERIA

(75) Inventors: Frances B. Haugen, Mountain View, CA (US); Abhishek Bapna, Palo Alto, CA (US); Weipeng Yan, Redwood City, CA (US); Osman Ahmed Osman, New York, NY (US)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 11/757,125

(22) Filed: Jun. 1, 2007

(65) Prior Publication Data

US 2008/0301093 A1 Dec. 4, 2008

(51) Int. Cl.
*G06F 7/00* (2006.01)
(52) U.S. Cl. .................................... 707/721; 705/14.54
(58) Field of Classification Search ................... 705/14; 707/3
See application file for complete search history.

(56) References Cited

U.S. PATENT DOCUMENTS

| | | | | |
|---|---|---|---|---|
| 5,614,927 | A * | 3/1997 | Gifford et al. ............... | 715/205 |
| 6,269,361 | B1 * | 7/2001 | Davis et al. ..................... | 707/3 |
| 6,701,309 | B1 * | 3/2004 | Beeferman et al. ................. | 1/1 |
| 7,100,111 | B2 | 8/2006 | McElfresh et al. | |
| 2003/0195837 | A1 * | 10/2003 | Kostic et al. ................... | 705/37 |
| 2003/0208594 | A1 * | 11/2003 | Muret et al. ................ | 709/224 |
| 2004/0254920 | A1 * | 12/2004 | Brill et al. ....................... | 707/3 |
| 2005/0071325 | A1 * | 3/2005 | Bem ............................... | 707/3 |
| 2005/0222901 | A1 * | 10/2005 | Agarwal et al. ............... | 705/14 |
| 2006/0064411 | A1 * | 3/2006 | Gross et al. ..................... | 707/3 |
| 2006/0069616 | A1 * | 3/2006 | Bau ............................ | 705/14 |
| 2006/0149625 | A1 * | 7/2006 | Koningstein ................. | 705/14 |
| 2006/0173744 | A1 * | 8/2006 | Kandasamy et al. .......... | 705/14 |

(Continued)

FOREIGN PATENT DOCUMENTS

KR 2003-0043827 6/2003

OTHER PUBLICATIONS

International Search Report issued in International Application No. PCT/US2008/065516 dated Jun. 2, 2008 (3 pages).

(Continued)

*Primary Examiner*—Neveen Abel Jalil
*Assistant Examiner*—Daniel Kinsaul
(74) *Attorney, Agent, or Firm*—Fish & Richardson P.C.

(57) ABSTRACT

Techniques for determining search query information for an advertising campaign and communicating the search query information to a sponsor of the advertising campaign are described. The techniques include receiving, from a sponsor of the advertisement, a request for search query information relating to the advertisement having been presented by a search service, identifying previously executed search queries submitted by users of the search service, wherein search results of the identified search queries have been presented with the advertisement to one or more users of the search service, compiling search query information, the search query information including ad performance data associated with the advertisement for the identified search queries, and providing the sponsor with the compiled search query information. A user interface may be generated to receive user input of selection criteria and provide an interface to search query information.

16 Claims, 6 Drawing Sheets

U.S. PATENT DOCUMENTS

| | | | |
|---|---|---|---|
| 2007/0011155 A1* | 1/2007 | Sarkar | 707/5 |
| 2007/0027762 A1 | 2/2007 | Collins et al. | |
| 2007/0033104 A1* | 2/2007 | Collins et al. | 705/14 |
| 2007/0143176 A1* | 6/2007 | Nong et al. | 705/14 |
| 2007/0179832 A1* | 8/2007 | Reich | 705/10 |
| 2008/0010142 A1* | 1/2008 | O'Brien et al. | 705/14 |
| 2009/0006207 A1 | 1/2009 | Datar et al. | |

OTHER PUBLICATIONS

U.S. Appl. No. 10/955,828, filed Sep. 30, 2004, David Bau.

* cited by examiner

1. Report Type

- ○ Ad Group Performance — View ad group performance data for one or more of your campaigns.
- ○ Campaign Performance — View performance data for your campaigns.
- ○ Account Performance — View performance data for your entire account.
- ● Search Query Performance — View performance data for search queries which triggered your ad and received clicks.
- ○ Placement Performance ⓘ — View performance data for sites where your ad was placed.

2. Settings

Level of Detail: [Campaign ▼] — 410a

View (Unit of Time): [Summary ▼] — 410b

Date Range:
- ○ [Last seven days ▼] — 410c
- ● [5/2/07] [5/25/07]

Campaigns:
- ● All campaigns — 410d
- ○ Manually select from a list

3. Advanced Settings (Optional)

▼ Add or Remove Columns — 422

Your report will display these columns: 425

| Campaign | Search Query | Search Query Match Type | Campaign Status | Impressions | Clicks | CTR | Avg CPC | Cost | Conversion Cost | Avg Position | Conversions | Conversion Rate | Cost/conversion |
|---|---|---|---|---|---|---|---|---|---|---|---|---|---|

Level of Detail: These columns reflect this report's coverage and level of detail
- ☑ Campaign Attributes: These columns report on your current ad settings and status
- ☑ Search Query
- ☑ Search Query Match Type
- ☐ Ad Distribution
- ☐ Daily Budget
- ☑ Campaign Status
- ☐ Ad Delivery Channel Performance Statistics: These columns feature data about how your ads are performing
- ☑ Impressions
- ☑ Clicks
- ☑ CTR
- ☑ Avg CPC
- ☑ Cost
- ☑ Avg Position Conversion Columns: These columns provide statistics on ad conversions and conversion rates
- ☑ Conversion Cost
- ☑ Conversions
- ☑ Conversion Rate
- ☑ Cost/conversion

4. Scheduling and E-mail

Scheduling: Schedule this report to run automatically _____

Email: Whenever this report runs, send email to: _____

FIG. 4

| Ad Campaign ID | Search Query | Search Query Match Type | Impressions | Clicks | Conversions |
|---|---|---|---|---|---|
| 001 | apple juice | Exact | 282 | 150 | 5 |
| 001 | cheap apple juice | Phrase | 50 | 20 | 2 |
| 001 | cheap apple juice | Broad | 27 | 15 | 4 |
| 002 | red roses | Exact | 24 | 15 | 9 |
| 002 | valentine flower | Broad | 10 | 5 | 3 |
| 002 | All other queries | Broad | 8 | 7 | 4 |
| ... | ... | ... | ... | ... | ... |

Fig. 5

DETERMINING SEARCH QUERY STATISTICAL DATA FOR AN ADVERTISING CAMPAIGN BASED ON USER-SELECTED CRITERIA

TECHNICAL FIELD

This disclosure relates generally to advertising.

BACKGROUND

Interactive media (e.g., the Internet) has great potential for improving the targeting of advertisements ("ads") to receptive audiences. For example, some websites provide information search functionality that is based on keywords entered by the user seeking information. This user query can be an indicator of the type of information of interest to the user. By comparing the user query to a list of keywords specified by an advertiser and associated with a particular advertisement or group of advertisements, such as an advertisement campaign, it is possible to provide targeted ads to the user. An example of such a system is AdWords™ offered by Google, Inc. (Mountain View, Calif.).

Web site-based ads (also referred to as "Web ads") are some times presented to their advertising audience in the form of "banner ads"—i.e., a rectangular box that includes graphic components. Ads can also be presented as sets of one or more text boxes, video ads, audio ads, and the like. When a member of the advertising audience (hereinafter referred to as a "viewer" or "user" without loss of generality) views one of the ads (such as when a page of content including the ad is displayed and/or rendered to the audience member), that is deemed to be an "impression" of the ad. When a user selects one of these ads by clicking on it, embedded hypertext links typically direct the viewer to the advertiser's Web site. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" (CTR) of the ad. A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase on the advertiser's web page within a predetermined time (e.g., seven days). Many other definitions of what constitutes a conversion are possible. The ratio of the number of conversions to the number of impressions of the ad (i.e., the number of times an ad is displayed) is commonly referred to as the conversion rate.

Another form of advertising is ad syndication, which allows advertisers to extend their marketing reach by distributing ads to additional partners. For example, third party online publishers can place an advertiser's text, image, audio or video ads on web properties with desirable content to drive online customers to the advertiser's website. An example of such a system is AdSense™ offered by Google, Inc.

In some systems, advertisers pay for their ads through an advertising auction system in which they bid on advertisement placement on a Cost-Per-Click (CPC) or a Cost-Per-Mille (e.g., thousand impressions) (CPM) basis. The auction can be run between competing advertisers via each bidders CPC and/or CPM bid, or through a more complex equation of CPC and CPM, such as one that weighs the advertiser's bid by that advertisement's known Click-Thru-Rate (CTR).

In some systems, advertisers may advertise on multiple websites, advertise in various parts of the world, and have many different types of advertisements (e.g., text, audio video). Advertisers may want to have statistical reports that provide useful information, so that they can adjust their advertising campaigns, e.g., reduce advertising on websites or from regions that are not producing the desired results, changing the type of advertisement ("ad"), or modifying the list of keywords specified by an advertiser and associated with a particular advertisement or group of advertisements, and so forth.

SUMMARY

According to one general aspect, a computer-implemented method includes receiving, from a sponsor of an advertisement, a request for search query information relating to the advertisement having been presented by a search service, identifying previously executed search queries submitted by users of the search service, wherein search results of the identified search queries have been presented with the advertisement to one or more users of the search service, compiling search query information, the search query information including ad performance data associated with the advertisement for the identified search queries, and providing the sponsor with the compiled search query information.

Implementations may include one or more of the following features. For example, the previously executed search queries include search queries submitted to the search service over a predetermined length of time, and each of the previously executed search queries is associated with at least a predetermined number of unique identifiers. The unique identifiers may include cookie identifiers. Compiling the search query information may further include linking the ad performance data to at least one of a query match type comprising at least one of an exact match, wherein an entered search query is identical to a key word used to invoke presentation of an advertisement, a phrase match, wherein a portion of the entered search query is identical to the key word used to invoke presentation of the advertisement, or a broad match, wherein the entered search query triggers an advertisement having similar content to that of the key word used to invoke presentation of the advertisement.

The method also includes providing the sponsor with the query match type, ad performance data, and identified search queries. The identified search queries trigger a display of the advertisement, or are associated with a click of the advertisement. The method further includes receiving a request from the sponsor of the advertisement to modify a set of keywords used to invoke presentation of the advertisement conditioned upon the compiled search query information. The request includes a request to add one or more of the identified search queries to the set of keywords, or includes a request to delete one or more of the set of keywords based on the identified search queries.

In another general aspect, an apparatus includes a computer program stored on a computer readable medium. The stored computer program includes executable instructions causing the computing device to perform functions including receiving, from a sponsor of an advertisement, a request for search query information relating to the advertisement having been presented by a search service, identifying previously executed search queries submitted by users of the search service, wherein search results of the identified search queries have been presented with the advertisement to one or more users of the search service, compiling search query information, the search query information including ad performance data associated with the advertisement for the identified search queries, and providing the sponsor with the compiled search query information.

In another general aspect, a system includes means for receiving, from a sponsor of an advertisement, a request for search query information relating to the advertisement having been presented by a search service, means for identifying previously executed search queries submitted by users of the search service, wherein search results of the identified search queries have been presented with the advertisement to one or more users of the search service, means for compiling the search query information, the search query information including ad performance data associated with the advertisement for the identified search queries, and means for providing the sponsor with the compiled search query information.

In another general aspect, a system includes a user interface configurable to receive, from a sponsor of an advertisement, a request for search query information relating to the advertisement having been presented by a search service, and a query management module configured to access previously executed search queries comprising search queries submitted to a search service over a predetermined length of time, in which each of the previously executed search queries is associated with at least a predetermined number of unique identifiers, compile search query information, the search query information including ad performance data associated with the advertisement for the identified search queries, and provide the sponsor with the compiled search query information.

Implementations may include one or more of the following features. For example, the query management module is configured to categorize the stored search queries into a query match type including at least one of an exact match, wherein an entered search query is identical to a key word used to invoke presentation of an advertisement, a phrase match, wherein a portion of the entered search query is identical to the key word used to invoke presentation of the advertisement, or a broad match, wherein the entered search query triggers an advertisement having similar content to that of the key word used to invoke presentation of the advertisement. The identified search queries are associated with a click of the advertisement. The unique identifiers may include cookie identifiers. The query management module receives a request from the sponsor of the advertisement to modify a set of keywords used to invoke presentation of the advertisement conditioned upon the compiled search query information.

In another general aspect, a computer-readable medium has embodied thereon a computer program for providing an interface to search query data. The medium includes one or more code segments configured to provide search query data in response to a request for output received from an application. The interface is configured to receive one or more user-selected parameters that define a requested output of search query data relating at least one keyword associated with an advertisement, and in response to receiving the one or more parameters, provide an output of statistical data corresponding to the one or more user-selected parameters.

Implementations may include one or more of the following features. For example, the interface is further configured to receive a request from a user to modify a set of keywords used to invoke presentation of the advertisement conditioned upon the output of statistical data. The one or more user-selected parameters include at least one of a query match type, number of impressions, number of clicks, number of conversions, conversion rate, click through rate, or cost per click.

Other implementations of determining search query statistical data for an advertising campaign based on user-selected criteria are disclosed, including implementations directed to systems, methods, apparatuses, computer-readable mediums and user interfaces.

BRIEF DESCRIPTION OF THE DRAWINGS

FIG. 4 is an example of a graphical user interface.

FIG. 5 is an example report of search query statistics.

Like reference numbers and designations in the various drawings indicate like elements.

DETAILED DESCRIPTION

Figure 1:
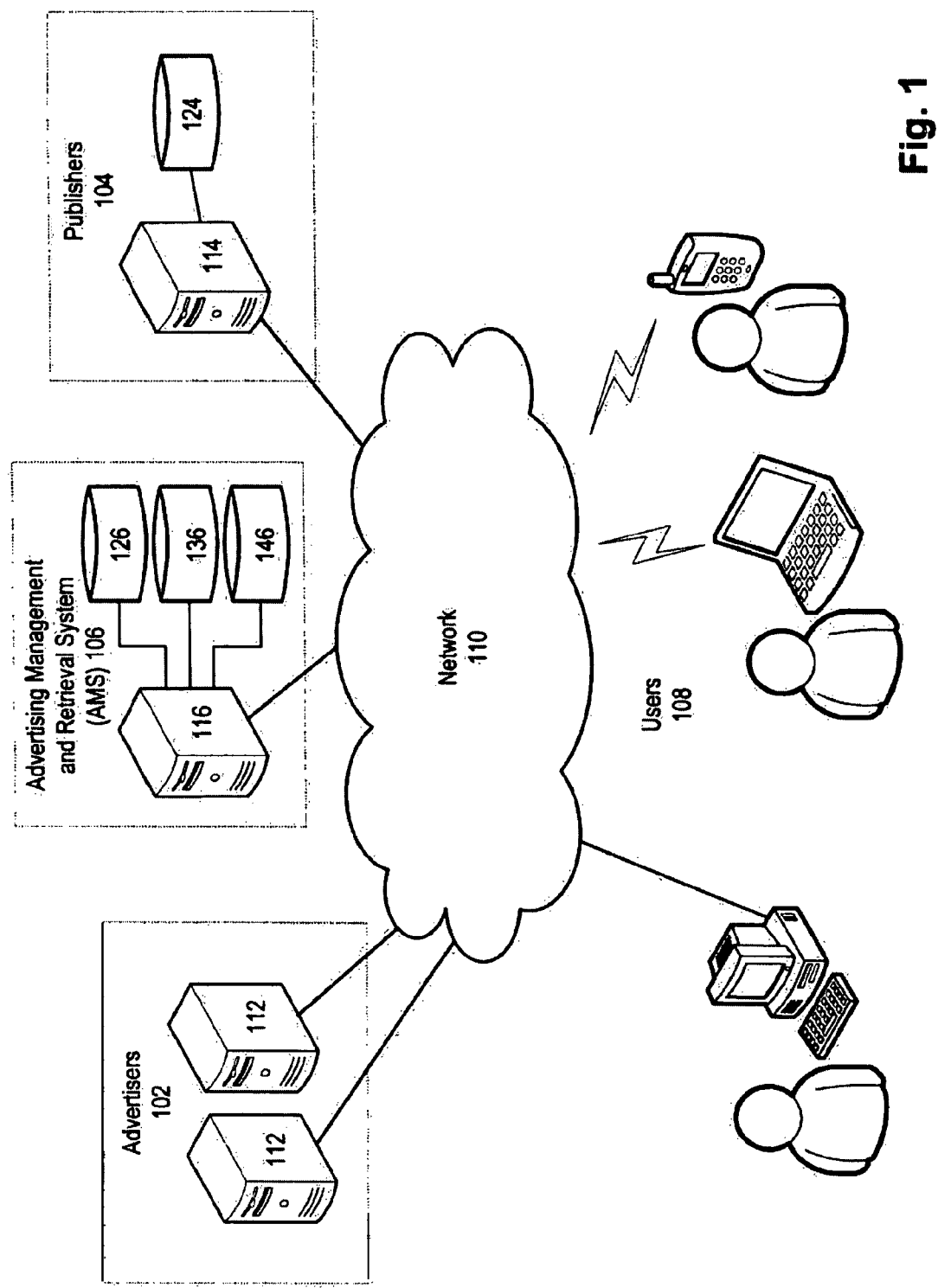
FIG. 1 is a block diagram of an example advertising environment.

FIG. 1 is a block diagram illustrating an example advertising environment 100. The environment 100 may include one or more advertisers 102, one or more publishers 104, an ad management system (AMS) 106, and one or more users 108 including one or more user access devices, which may be coupled to a network 110. In some examples, each of the elements 102, 104, 106, 108 and 110 may be implemented or associated with hardware components, software components, or firmware components or any combination of such components. The elements 102, 104, 106, 108 and 110 could, for example, be implemented or associated with general purpose servers, software processes and engines, and/or various embedded systems.

The advertisers 102 include entities that are associated with advertisements ("ads"). An advertisement or an "ad" refers to any form of communication in which one or more products, services, ideas, people, organizations or other items are identified and promoted. Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, telephone networks, and other media.

In some implementations, the advertisers 102 provide (or be otherwise associated with) products and/or services related to ads. The advertisers 102 may include or be associated with, for example, retailers, wholesalers, warehouses, manufacturers, distributors, health care providers, educational establishments, financial establishments, technology providers, energy providers, utility providers, or any other product or service providers.

The advertisers 102 directly or indirectly generate, maintain and/or track ads, which may be related to products or services offered by or otherwise associated with the advertisers. The advertisers 102 may include or maintain one or more data processing systems 112, such as servers or embedded systems, coupled to the network 110. The advertisers 102 could include or maintain one or more processes that run on one or more data processing systems.

The publishers 104 include entities that generate, maintain, provide, present and/or otherwise process content in the environment 100. In some implementations, the publishers 104 may include content providers with an Internet presence, such as online publication and news providers (e.g., online newspapers, etc.), online service providers (e.g., financial service providers, health service provider, etc.), and the like. The term "content" refers to various types of web-based and/or other information, such as articles, discussion threads, reports, analyses, financial statements, music, video, graphics, search results, web page listings, information feeds (e.g., RSS feeds), television broadcasts, radio broadcasts, printed publications, etc.

The publishers 104 receive requests from the users 108 (or other elements in the environment 100) and provide or present content to the requesting devices. The publishers may provide or present content via various mediums and in various forms, including web based and non-web based mediums and forms. The publishers 104 may generate and/or maintain such content and/or retrieve the content from other network resources.

In some implementations, the publishers 104 could provide searching services and provide content in the form of search results. A search service can receive queries for search results and retrieve relevant search results from various sources, such as an index of documents (e.g., from an index of web pages). Search results can include, for example, lists of web page titles, snippets of text extracted from those web pages, and hypertext links to those web pages.

In addition to content, the publishers 104 may be configured to integrate or combine retrieved content with ads that are related or relevant to the retrieved content for display to users. These relevant ads may be provided from the AMS 106 and may be combined with content for display to users. As described further below, the user access devices associated with users 108 could also process ads for display to users. In some examples, the publishers 104 could retrieve an article for display on a particular user's 108 user access device and then forward the article to the user's 108 user access device along with code that causes one or more ads from the AMS 106 to be displayed to the user. In other examples, the publishers 104 could retrieve an article, retrieve one or more relevant ads (e.g., from the AMS 106 or the advertisers 102), and then integrate the ads and the article to form a content page for display to the user.

The publishers 104 include, operate, or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The AMS 106 manages ads and provides various services to the advertisers 104, the publishers 106, and the users 108. The AMS 106 may include one or more data processing systems 116, such as servers or embedded systems, coupled to the network 110. It could also include one or more processes, such as server processes.

In some implementations, the AMS 106 may allow elements in environment 100 to store, select and/or retrieve ads for presentation to users. For example, the AMS 106 may facilitate the distribution of ads from the advertisers 102 to the users 108 via the publishers 104. The AMS 106 may also manage and process various agreements and transactions among and between elements in environment 100. For example, the AMS 106 may credit accounts associated with the publishers 104 and debit accounts of the advertisers 102.

The AMS 106 may allow the advertisers 102 to directly or indirectly, enter, maintain, and track ads for presentation on a user's 108 access device. In some examples, the ads may be stored in an ad repository 126. The AMS 106 may allow the advertisers 102 to select and/or specify new or existing ads as well as conversion types for ads. A "conversion" may occur when a user consummates a transaction related to a given ad. What constitutes a conversion may vary. For example, a conversion could be defined to occur when a user clicks on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). Each conversion type may correspond to a conversion action that a user may perform, such as a purchase of a product or service, a section of a banner ad (click-through) or other action. The AMS 106 may store conversion data and other information in a conversion data repository 136.

The AMS 106 may also allow the advertisers 102 to input description information associated with ads. This information could be used to assist the publishers 104 in determining ads to publish. The advertisers 102 may additionally input a cost/value associated with selected conversion types, such as a five dollar credit to the publishers 104 for each product or service purchases.

The AMS 106 may provide ads to the publishers 104 and/or the users 108. In some examples, the AMS 106 may send ads to a requesting user 108 when the user 108 loads content from a particular publisher 104. The ads can be placed with or embedded in a publisher's content (e.g., videos, articles, etc.), which can be stored in the content repository 124 at the publisher, and/or placed with content received from other sources (e.g., other publishers, advertisers).

The AMS 106 may provide ads to publishers and/or user access devices such that the ads are displayed in ad presentations. An ad presentation may refer to any type of communication or display of one or more ads. The AMS 106 may present ads via various mediums and in various forms, including web based and non-web based mediums and forms. In some examples, ads may be presented in an "ad portion" of a user display. The term "ad portion" refers to any portion (which could include all) of a display in which ads can be situated. The ad portion can be a discrete, isolated portion of a display or it can be blended and dispersed throughout a display.

In some examples, the ad portion may include a portion of a web page or browser display with also displays content. The ad portion may separate and distinct from other content in the display. For example, the ad portion could be a window or frame that is separate from displayed content. The ad portion could also be integrated and blended with displayed content. For example, the ad portion could include several sub portions dispersed throughout a web page and integrated with displayed content.

The AMS 106 may allow the publishers 104 to search and select specific products and services as well as associated ads to be displayed with content provided by the publishers 104. For example, the publishers 104 could search through ads in the ad repository 126 and select certain ads and block or filter out other ads. In some examples, the AMS 106 may contextually determine or recommend specific items and ads based on, for example, relevance to the publishers site content. The AMS 106 could also determine specific items and ads based on user behaviors, such as particular search queries performed on a search engine website, a geographical location of the user, etc. The AMS 106 could, in some examples, store user-related information (e.g., personal profiles of users, geographic locations of users, ad context information) in a general data repository 164. A combination of these and other approaches could also be used to provide ads to the publishers 104. The ad selections and preferences specified by the publishers 104 can be used by the AMS 106 when it selects ads for display to the user's 108 device.

The AMS 106 may include or access one or more network searching, crawling and indexing modules (not shown). These modules may crawl the network 100 to search, identify, index and store content. The AMS 106 or another element may associate content keywords or other information with crawled content using various algorithms and logic. The content keywords may summarize aspects of the content. The AMS 106 may maintain or access an index or listing of identifiers (e.g., URLs) associated with crawled content. The identifiers may be associated with the keywords and/or other information. In some implementations, the AMS 106 may include or access a listing of URL-keyword pairings.

Using crawled and indexed network content, The AMS 106 may be configured to identify advertisements in the ad repository 126 relevant to a user's interest. The AMS 106 may be configured to compare information associated with requested content (e.g., URLs) with indexed identifiers associated with crawled content. The AMS 106 may use associated content keywords to identify and retrieve relevant ads. In some implementations, the AMS 106 could receive information (e.g., ad keywords) from the advertisers 102 relevant to the advertiser's product and services, which could be used in identifying relevant ads.

As an example, the AMS 1206 can receive a URL of a requested content page (e.g., from the user 108 or the publisher 104). The AMS 106 may use the URL to identify the user interest (i.e., the requested content). For example, the AMS 106 may match the URL to indexed content keywords associated with the URL. The AMS 106 may then match the user interest with ads in the repository 126 relevant to the interest. The AMS 106 may use ad keywords from the advertisers 102 and/or other ad information to identify the ads. In some examples, the AMS 106 could compare ad keywords from the advertisers 102 or other information to content keywords and/or content in the content page to identify relevant ads.

In some examples, the ad preferences and selections specified by the publishers 104 and/or advertisers 102 may be used in determining relevant ads. For example, the AMS 106 may reject certain ads based on publisher preferences, even though the rejected ads may be relevant to the determined user interest.

The AMS 106 also is configured to determine and maintain information about ad impressions and report the information to other elements in the environment 100. The term ad "impression" refers to any form of presentation of an ad such that it is viewable to a user. In some examples, an ad impression may occur when an ad is displayed on a display device of a user access device. The AMS 106 may be configured to determine and maintain the number of ad impressions relative to the number of potential ads useable for presentation. The AMS 106 may also determine and maintain the ratio of the number of click-throughs to the number of impressions of the ad. The term "click-through" refers, for example, to a user selection of an ad. A "click-through" may also refer to other types of user selections. Information about impressions, click-throughs, clicks, and the like, may be referred to as ad performance data.

In some implementations, the AMS 106 may manage and process financial transactions among and between elements in the environment 100. For example, the AMS 106 may credit accounts associated with the publishers 104 and debit accounts of the advertisers 102. These and other transactions may be based on conversion data, impressions information and/or click-through rates received and maintained by the AMS 106.

The users' 108 user access devices may include any devices capable of receiving information from the network 110 and displaying or otherwise presenting ads. In some implementations, the user's 108 access devices may receive ads and ad related information from the AMS 106 and present the ads (e.g., via a browser or other viewer) to users. The user's 108 access devices may combine ads received from the AMS 106 with content received from the publishers 104 or other sources for presentation to users. Additionally or alternatively, the user's 108 access devices may receive combined ads and content from the publishers 104 and present (e.g., in a viewer) this information to viewing users.

The user's 108 access devices could include general computing components and/or embedded systems optimized with specific components for performing specific tasks. Examples of user systems include personal computers (e.g., desktop computers), mobile computing devices, cell phones, smart phones, media players, media players/recorders, music players, game consoles, media centers, electronic tablets, personal digital assistants (PDAs), television systems, audio systems, removable storage devices, navigation systems and the like. The user's 108 access devices could also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 could include any number of geographically-dispersed advertisers 102, publishers 104 and/or users 108, which may be discrete, integrated modules or distributed systems. Similarly, the environment 100 is not limited to a single AMS 106 and may include any number of integrated or distributed AMS elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine.

Figure 2:
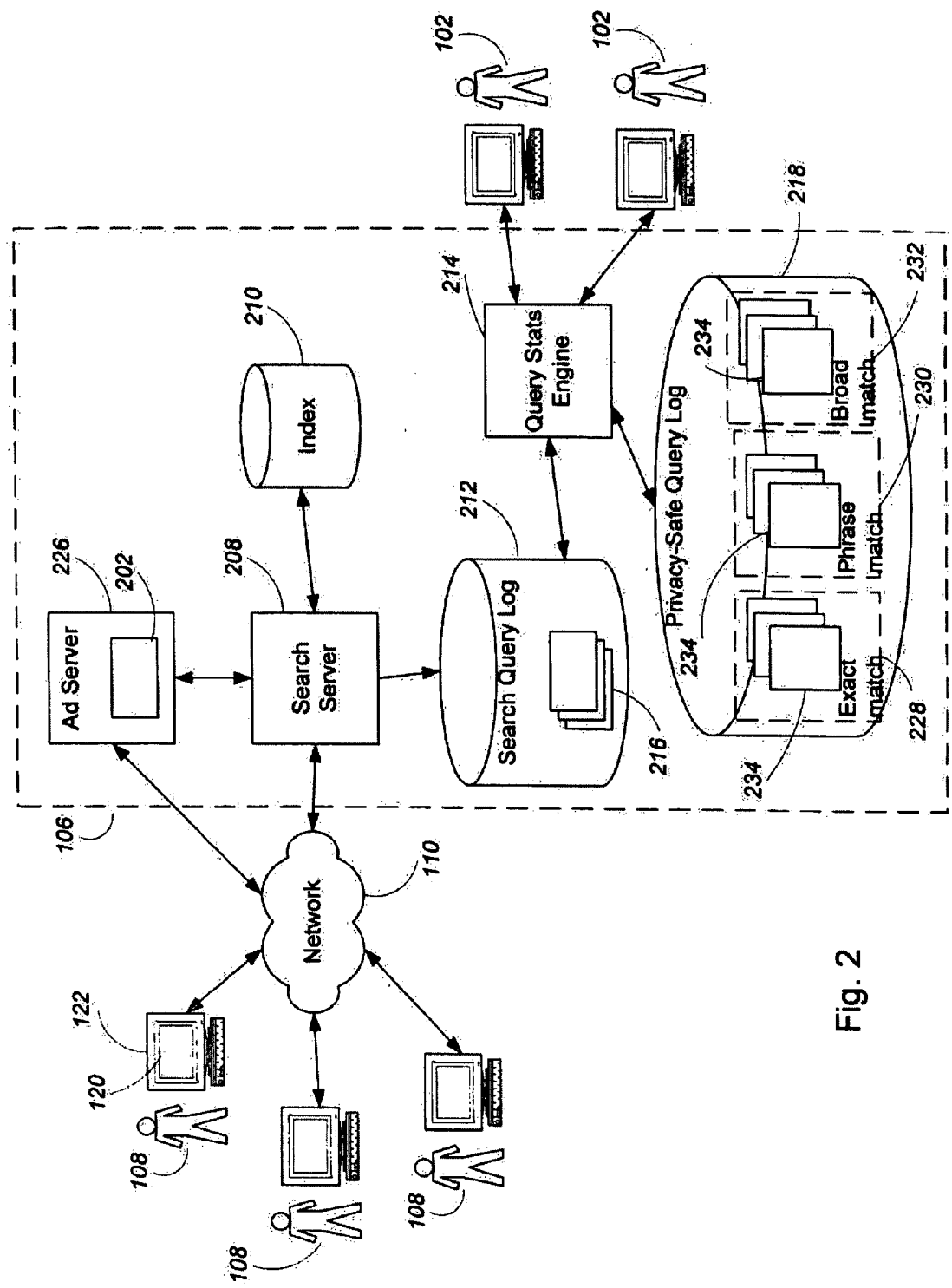
FIG. 2 is a block diagram of an example information retrieval system.

FIG. 2 is a block diagram of an example information retrieval system. More particularly, FIG. 2 illustrates an implementation of the AMS 106 for retrieving and displaying information concerning advertisements or ads that match search queries submitted by users 108. The AMS 106 provides search query information to advertisers 102 (sponsors of the ads) to provide transparency and to allow the advertisers 102 to improve the performance of ad campaigns. In some implementations, the AMS 106 provides the advertisers 102 the raw query terms of the search queries received by the AMS 106 in which there is a low probability, or perhaps a very low probability (e.g., close to zero), that the search queries include personal information (e.g., home address or social security numbers associated with individuals).

The AMS 106 may receive, for example, a very large number of search queries a week, and finding which search queries do not include personal information manually can be laborious and time consuming. A feature of the AMS 106 is that it can automatically identify search queries that have a low probability, or perhaps a very low probability (e.g., close to zero), of containing personal information. For example, when different people submit search queries, it is unlikely that many people submit queries for the same specific personal information. Moreover, it is unlikely that, out of a very large number of search queries that a number of people will submit search queries containing the same social security number. When many search queries are gathered over a period of time, not only is it unlikely that search queries each being submitted by multiple users will include personal information, it is also unlikely that those search queries can be used to identify the identity of the user who submitted a particular query or that search information is traceable to a particular individual.

Another feature of the AMS 106 is that it can show a small percentage of the total search queries received to the advertisers 102, while covering a large percentage of the total search queries received to the advertisers 102, while covering a large percentage of the search queries relevant to the advertisers 102. Advertisers 102 generally are most concerned about which search queries result in their ads being clicked on. A large percentage of the ads that are clicked on are triggered by search queries that each have been submitted by multiple users 108. The users 108 who clicked on a particular ad are likely to have been shown the particular ad because they type in similar search terms. For example, a large percentage of the clicks for an ad for a particular portable music player may come from users who have typed in the name of that particular music player and hence have the same or similar search queries. For example, the AMS 106 may show the advertiser 102 less than 1% of the total unique search queries received over a period of time and cover more than 50% of the search queries that triggered clicks on the ad.

The AMS 106 includes a search server 208 that enables the users 108 to search for information using, for example, a keyword search as discussed above. In some implementations, the user 108 may use a web browser 120 executing on a client machine 122 (e.g., personal computer) to access the search server 208 through the network 110. The user 108 sends a search request that includes a search query to the search server 208. The search query may include one or more search terms (e.g., keywords or key phrases). In response, the search server 208 searches an index 210, returns a list of pages that match the search query submitted by the user 108, and provides the list of pages in a sequence according to rank scores of the pages. The search server 208 may also cause ads to be displayed alongside the list of returned pages if, for example, the search query matches one or more keywords in the advertiser sponsor's list of keywords as will be discussed herein below. The ads may be provided by an ad server 226.

The AMS 106 includes a search query log 212 that stores the search queries submitted by the users 108 and information associated with the search queries. The information may include, e.g., a time stamp specifying when the search query was submitted, an IP address of the user submitting the search query, and a unique cookie identifier. The information about a search query may also indicate, for example, which ads were displayed and/or clicked when triggered by the search query.

The term "search request" refers to the request for information sent from the user 108 to the search server 208, and the term "search query" refers to the search terms and operators (e.g., Boolean operators) contained in the search request. Search requests from different users 108 may contain the same search query. As described below, different users 108 may be associated with different identifiers, such as cookie identifiers. Thus, a search query may be associated with multiple unique identifiers if multiple users 108 submit the same search query.

The AMS 106 includes a query statistics engine 214 that processes search queries 216 from the search query log 212 and provides information about the search queries 216 to the advertisers 102. The advertisers 102 may use the information about the search queries 216 to improve their ad campaign and to determine whether their ads are reaching the target audience.

In some implementations, the engine 214 provides a graphical user interface, such as the graphical user interface 400 described more fully below with respect to FIG. 4, to allow the advertisers 102 to select what statistics to view. For example, the advertiser 102 may request to view the search queries that triggered particular actions, e.g., causing the ad to be displayed, clicked, or converted. In response the engine 214 identifies search queries 216 that are associated with the particular ad and actions. The engine 214 may provide raw query terms (e.g., the actual search terms submitted by the users 108) of the search queries 216 to the advertiser 102. The query statistics engine 214 has a built-in safeguard to prevent showing search queries 216 with personal information.

For example, some users 108 may include their home addresses in search queries to search for local information. Also, some users 108 may enter their social security numbers in search queries 216 to see whether their social security numbers are listed in public documents. The users 108 may enter personal information in search queries for other reasons. To protect the privacy of the users 108, the query statistics engine 214 identifies search queries 216 that do not include personal information, referred to as "privacy-safe" queries 234, and stores those queries in a privacy-safe query log 218. In some implementations, once a search query is placed into the safe query log 218, it is not removed from the log 218. When a request for search query data or statistics is submitted by the sponsor of the advertisement 102, the query statistics engine 214 accesses the query log 218 containing the privacy-safe information and provides that data to the advertisers 102.

In some implementations, the query statistics engine 214 also identifies privacy-safe queries 234 by identifying search queries 216 that have been submitted by at least a predetermined number of unique users, over a predetermined length of time. For example, if the same search query 216 is submitted by a number of unique users 108, for example, 50 unique users, over a period of time, for example, 90 days, it is unlikely that the unique users 108 are querying the same specific personal information. The requirement that the search queries 216 be submitted by at least a predetermined number of unique users can be seen as a popularity threshold, in which only search queries 216 that are popular among different users are deemed privacy-safe. The criteria, for example, the number of unique users and the length of time, used by the query statistics engine 214 to identify privacy-safe search queries 234 can vary depending on, for example, the type of search service provided by the search sever 208.

In some implementations, the query statistics engine 214 may perform query normalization to consolidate the search queries 216 when identifying privacy-safe search queries 234. Query normalization can be performed by breaking down the search query into search terms (or tokens) and preserve the sequence of the search terms. For example, two or more spaces between two keywords in the search query can be reduced to one white space. Special operators, negative terms, and certain connector symbols can also be removed from the search queries.

For example, the search query "apple juice" (with two or more white spaces between "apple" and "juice") and the search query "apple juice" (with one white space between "apple" and "juice") can be determined to be the same search query. The search query "apple-orange juice" and "apple juice" can also be determined to be the same search query as "apple juice." Thus, if the search queries "apple juice," "apple juice," "apple-orange juice," and "apple" and "juice" are submitted by four different users, the query statistics engine 214 may consider the search query "apple juice" to be submitted by four unique users. This increases the possibility that a query (e.g., "apple juice," or "apple juice," "apple-orange juice," or "apple" and "juice") may be marked as a privacy-safe query while not violating privacy, as extra spaces and certain connection symbols do not disclose any personal information.

In some implementations, the query statistics engine 214 uses a proxy method to determine whether the search queries 216 are submitted by unique users 108 based on cookies associated with the users 108. When the user 108 uses the web browser 120 to access the search server 208, the search server 208 is configured to cause the web browser 120 to store a cookie at the client device 122 when the user 108 first accesses the search server 208. Each cookie can include an identifier, but should not include personal information of the user 108. When the user 108 sends a search request to the search server 208, the cookie identifier can also be provided to the search server 208. The cookies stored in different client devices 122 may have different identifiers.

The query statistics engine 214 identifies normalized search queries 216 submitted by unique users 108 by finding search queries 216 associated with different cookie identifiers. Multiple users 108 may be using the same client device 122, so it is possible that search queries 216 submitted by different users are associated with the same cookie identifier. This does not typically affect the ability of the engine 214 to identify privacy-safe search queries 234, because when the engine 214 is configured to identify search queries 216 that are associated with at least n unique cookie identifiers, and each cookie identifier is associated with one or more unique users 108, then the privacy-safe search queries 234 may be associated with n or more unique users 108. Although a user 108 may use multiple client devices 122 to access the search server 208 and be associated with multiple cookie identifiers, the likelihood that the user 108 will use the multiple client devices 122 to submit the same search query that includes the same personal information is low and the frequency of such activity is low such that the number of unique users per query would highly likely fall under the unique user threshold.

In some implementations, users 108 have the option of turning off cookies. When the user 108 turns off the cookies in the web browser 102, the search server 208 may still assign a cookie to the web browser 120, but the web browser 120 may not store the cookie. When the web browser 120 sends a search request to the search server 208, the search server 208 will receive the cookie, which includes a first time stamp of when the cookie was generated and a second time stamp of when the cookie was sent by the web browser 120. The search server 208 can determine whether the user 108 has turned off the cookie by, e.g., determining a freshness of the cookie based on a comparison of the first and second time stamps. If the difference between the two time stamps is less than, for example, 10 seconds, the cookie is considered to be fresh and the engine 214 determines that the cookie has been turned off by the user 108.

In some implementations, users 108 who have submitted the same search query with the cookies turned off may be lumped together and considered to be one unique user by the engine 214. Thus, if the threshold of unique users is p for determining whether a search query 216 is privacy-safe, then the search query 216 may be considered to be privacy-safe if there are at least p−1 unique users 108 who have submitted the search query 216 and have not turned off the cookie, and one or more users 108 who have submitted the search query 216 but have turned off the cookie.

The query statistics engine 214 may compile or categorize the privacy-safe search queries 234 into different categories based on a similarity level of the search terms and the keywords associated with the ad, and this information may also be reported to the sponsor of the advertisement at the sponsor's request. For example, the search queries 234 may be categorized into three categories: exact match category 228, phrase match category 230, and broad match category 232. The exact match category 228 includes search queries 234 in which the search terms are exactly the same as the ad keywords. The phrase match category 230, also referred to as an expanded match category, includes search queries 234 in which the ad keywords are part of (e.g., a sub-string of) the search terms. The broad match category 232 includes search queries 234 in which the advertising keywords matches the same content category as the search terms. Other match types are also possible and can be used.

For example, if an ad is associated with the advertising keyword "plasma hdtv," a search query 234 having search terms "plasma hdtv" may be placed in the exact-match category 228. A search query 234 having search terms "cheap plasma hdtv" or "plasma hdtv" may be placed in the phrase-match or expanded match category 230 because the keywords are part of the search terms. Search queries 234 have search terms "high definition flat screen TV" or "LCD hdtv" may be placed in the broad-match category 232.

The AMS 106 may include a matching engine (not shown) that matches the set of search queries to the advertisement. The matching engine may include, for example, an exact match engine, an expanded match or phrase match engine, and a broad match engine.

Figure 3:
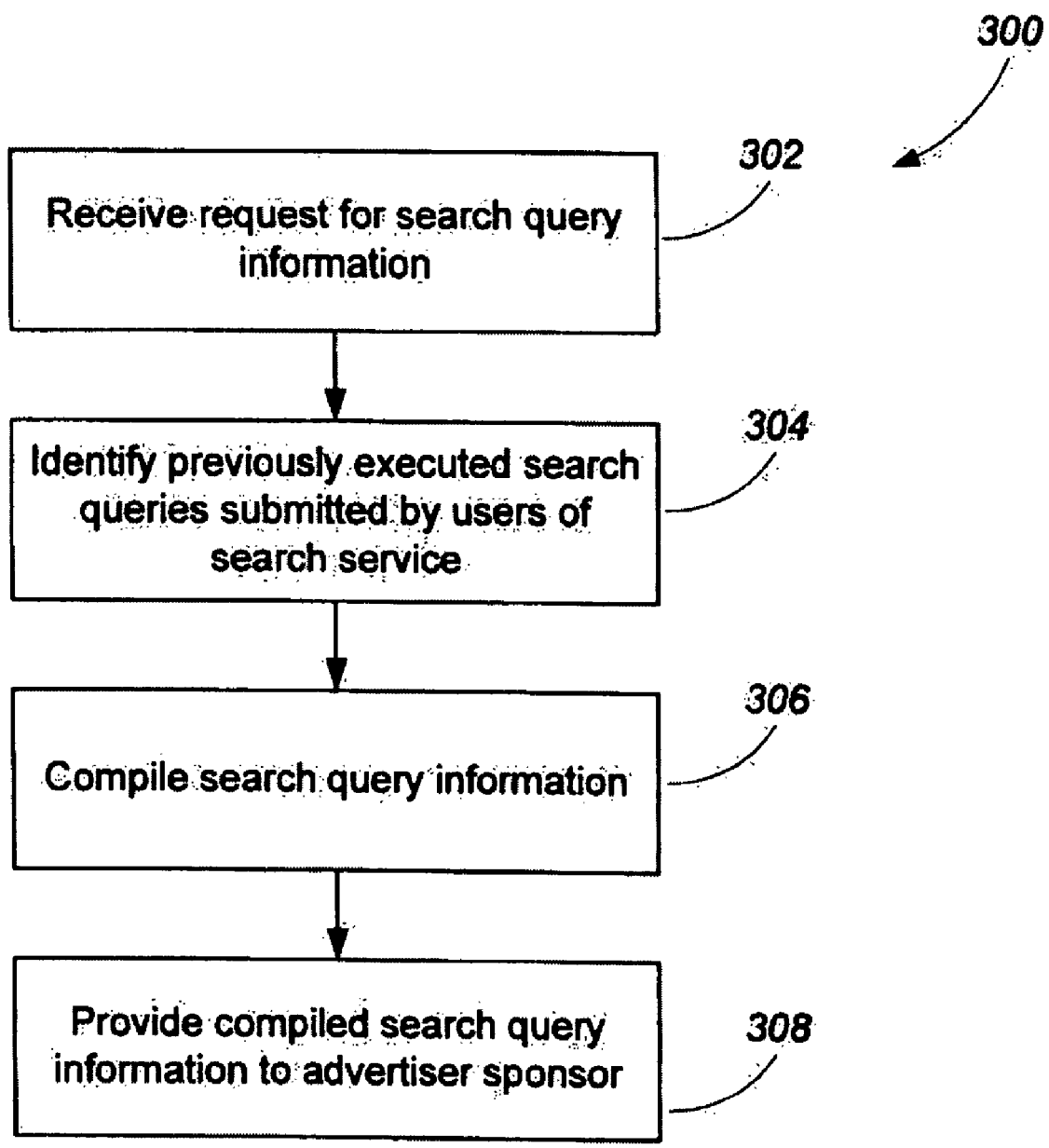
FIG. 3 is a flow diagram illustrating an example process for compiling and processing advertising data.

FIG. 3 is a flow diagram illustrating an example process for compiling and processing advertising data and providing search query information, including ad performance data, to a sponsor of an advertisement.

In process flow 300, a request for search query statistics or information, which in some implementations, is in the form of a request for a summary report of search query information, is received (302) from a sponsor of an advertisement or advertising campaign. The request may include one or more parameters or selection criteria associated with the advertisement that define the output that the sponsor wants to see in the report. In some implementations, the one or more parameters relate to one or more ad keywords used to invoke presentation of the advertisement. In some implementations, the request for the report is received (302) from the sponsor via one or more screens of a user interface, such as user interface illustrated in FIG. 4, which is discussed in more detail below. The request may be submitted by, for example, an advertiser who wishes to review the performance of his or her advertisements, and in particular, who wishes to determine if the advertising keywords the advertiser has established for the advertisements need to be revised, deleted, or modified in some manner.

The process 300 identifies previously executed search queries from a search query log (304) submitted by users of a search service that triggered the ad, that is, where search results of the identified search queries were presented with the advertisement to one or more users of the search service. In some implementations, these executed search queries are stored in the safe query log 218, the search queries can be the search queries 234, and the query statistics engine 214 can be used to identify the search queries. The identified search queries, and the ad performance data associated with the advertisement for the identified search queries, is compiled into search query information (306), which can then be provided to the sponsor (308) via, for example, electronic mail, posting to an extranet site, mail, or by some other suitable communication method. In some implementations, the ad performance data is stored in the search query log 216, and the query statistics engine 214 compiles the ad performance data and the search queries from the safe query log 218 to provide the search query information to the advertisement sponsor. In some implementations, the search query information can also include the search query type (e.g., exact match 228, phrase match 230, or broad match 232) obtained, for example, from the safe query log 218. In some implementations, the search query information can be filtered in accordance with one or more user-selectable criteria, such as, for example, a number of instances of a query, a number of impressions, a number of unique users, a number of clicks, a threshold click-through rate, an average cost-per-click, status (e.g., active, deleted, disapproved), or advertising campaign type (e.g., content, site targeted, or vertical targeted). In this manner, the requesting sponsor may tailor the search query statistics it wishes to review.

In some implementations, the sponsor of the advertisement or advertising campaign may review the report and adjust their advertising campaign accordingly conditioned upon the compiled search query information. For example, the advertiser may request to add one or more of the identified search queries to its list of advertising keywords. This may be the case, for example, where the search query information shows that one or more of the identified search queries met certain of the advertiser's performance criteria, such as, number of impressions, clicks, or conversions. Alternatively, the advertiser may request to delete one or more of its advertising keywords from its keyword list based on the identified search queries. This may be the case, for example, where the search query information shows that one or more of its keywords are not meeting is performance criteria in terms of, for example, number of impressions, clicks, or conversions. In some implementations, the advertiser may modify their campaign manually. In some implementations, the advertiser may create rules that may be triggered based on the search query information included in the reports. The created rules may automatically modify the advertising campaign based on the information contained in the reports. For example, the advertiser may create a rule specifying that a search query be added to its list of keywords when a certain number of impressions is attained.

FIG. 4 illustrates an example of a user interface (GUI) 400, such as a graphical user interface that runs on a computer associated with one or more of the advertisers users 102. The user interface 400 is configured to allow advertiser 102, such as the sponsor of an advertisement or advertising campaign, to select one or more components or selection criteria associated with an advertisement. In some implementations, the AMS 106, and more particularly, the query statistics engine 214, uses the advertiser's selection criteria to generate various types of reports in the manner discussed above. The GUI 400 includes a first portion 405 that includes a set of interactive fields to allow the advertiser 102 to decide what type of report to generate. In this example, a report for search query performance is selected. The GUI 400 includes a second portion 410 that includes a set of interactive fields that allows the advertiser 102 to choose a number of various settings that will control the details set forth in the report, including (i) a level of detail field 410a, such as, for example, a particular advertising campaign or group of advertisements, (ii) a unit of time view field 410b, (iii) a date range field 410c, and (iv) a Campaign field 410d that allows the user to select all of its advertising campaigns, or manually select specific campaigns from a pull-down list (not shown). The advance settings control portion 420, which as indicated is optional in this implementation, allows the user to choose from various additional settings that will control the details set forth in the report, including an add or remove columns setting 422 and a filter the results setting (not shown). The advanced settings control portion 420 provides a set of check boxes divided into multiple categories of columns 425, which allow the user to optionally select wheat information to show in the report. The categories 425 can include "Level of Detail," "Attributes", "Performance Statistics," and "Conversion Columns." In this example, the items "campaign," "search query," "search query match type" (e.g., exact match, phrase match, or broad match), "campaign status," "impressions," "clicks," "CTR," "avg CPC," "cost," "avg position," "conversion cost," "conversions," "conversion rate," and "cost/conversion" were selected.

The GUI 400 may also include a "Scheduling and E-mail" control portion 430 that includes a scheduling command 430a, which allows the user to schedule the report to run automatically at various time intervals, such as for example, daily, weekly, monthly, etc., and an email command 430b that allows the user to enter one or more email addresses to which the report should be routed. The GUI 400 may include additional portions to allow the user to make additional selections. After the user finalizes the selections, the user can click on a "create report" button (not shown) to generate the report.

FIG. 5 illustrates an example search query statistics report 500. The report includes search query information associated with one or more advertisements or advertising campaigns placed by an advertiser. For example, for an advertising campaign listed in the report, the report may show an Advertising Campaign Identification (ID) 502, Search Query 504, Search Query match Type 506, number of impressions 508, number of clicks 510, and number of conversions 512. In some implementations, the counts of impressions, clicks, and conversions in a report are for a predefined time period, e.g., a one-month span. The report may indicate the time period for which the reported data is applicable. In addition, in some implementations additional information may be provided, such as, for example, the campaign status (e.g., active, cancelled), the click-through rate, average cost-per-click, conversion cost, cost, conversion rate, or cost per conversion.

In the example report illustrated in FIG. 5, search query information for two example advertising campaigns (ID001 and ID002) are presented. The data illustrates the number of impressions, clicks, and conversions each campaign received for each particular search query presented by users. For example, for the search query "apple juice," which happens to be an exact match of the advertiser's keyword "apple juice," which resulted in 282 impressions, 150 clicks, and 5 conversions for the advertiser's ad associated with this search query. As also illustrated in this example report in the "Search Query" column as "All other queries," in some implementations, not all search queries that trigger an advertisement appear in the report because those search queries either may not meet certain defined privacy criteria as discussed above, or represent outlier search queries that have a low search volume as compared to other queries. It should be appreciated that the example report shown in FIG. 5 is merely illustrative. A search query report may include more or less data than that shown, and alternative reporting formats may be used.

Figure 6:
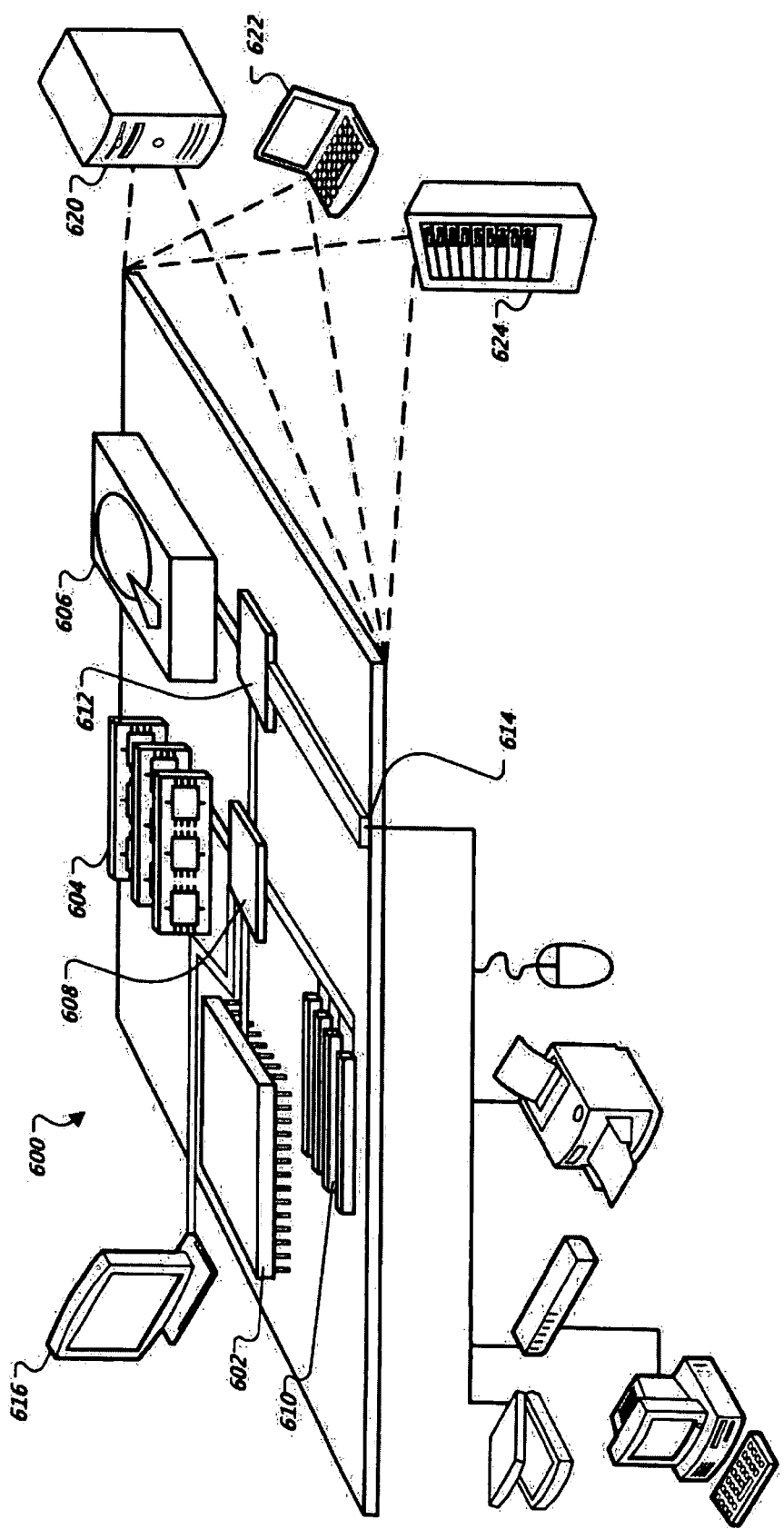
FIG. 6 is a schematic representation illustrating an example system architecture for advertising search query data compiling and reporting system.

FIG. 6 is a schematic representation illustrating an example system architecture for an advertising search query data compilation and reporting system that can be used as, for example, the search server 208, the ad server 226, or the query statistics engine 214. The computing apparatus 600 is intended to represent various forms of digital computers, such as laptops, desktops, workstations, personal digital assistants, servers, mainframes, and other appropriate computers. The components shown here, their connections and relationships, and their functions, are examples only, and are not meant to limit implementations described in this document.

Computing apparatus 600 includes a processor 602, memory 604, a storage device 606, a high-speed interface 608 connecting a memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, a multi-processor system a peer-to-peer network, a grid computing infrastructure, or an ad hoc peer-to-peer network).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operation as for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, IEEE 1394, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Each of such devices (e.g., standard server, rack server system, personal computer, laptop computer) may contain one or more of computing device 600, and an entire system may be made up of multiple computing devices 600 communicating with each other.

In some examples, the client devices 122 can be, e.g., laptops, desktops, workstations, personal digital assistants, mobile phones, or other portable computing devices.

The disclosed and other implementations and the functional operations described in this description can be implemented in digital electronic circuitry, or in computer software, firmware or hardware, including the structures disclosed in this specification and their structural equivalents, or in combinations of one or more of them. The disclosed and other implementations can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this description can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed techniques can be implemented on a computer having a display device, e.g., a CRT (cathode ray tube) or LCD liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., a visual feedback, auditory feedback, or tactile feedback; and input from the user can be received in any form, including acoustic, speech, or tactile input.

The disclosed techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this description contains many specifics, these should not be construed as limitations on the scope of what is being claimed or of what may be claimed, but rather as descriptions of features specific to particular implementations. For example, the privacy-safe queries 234 can be classified into categories different from those described above. The search query statistics provided to the advertisers 102 can be different form those described above. Two or more of the search server 208, the ad server 226, the query statistics engine 214 can be performed by the same machine, e.g., a server computer. The search queries can include query terms written in different languages. Search queries written in different languages may be considered to be different search queries, even if they have the same meaning. Normalization of the search queries can be performed differently than those described above.

Artificial intelligence or pattern matching methods may be used to augment the processes for identifying privacy-safe queries. For example, after the query statistics engine 214 identifies privacy-safe search queries 234 by identifying search queries 216 associated with at least a predetermined number of unique identifiers submitted over a predetermined period of time, the engine 214 may use artificial intelligence or pattern matching methods to examine the privacy-save queries 234 to see if they include patterns that are similar to certain types of personal information. For example, the engine 214 may examine the search queries 234 to determine whether they include patterns of the type "xxx-xx-xxxx," which may be a social security number, or patterns that are similar to credit card numbers or bank account numbers. The engine 214 may exclude search queries that include such questionable patterns from the privacy-safe query log 218.

For example, the at least predetermined number of unique identifiers may correspond to, in some implementations, at least ten, fifty, or one hundred unique users. Other predetermined numbers may also be used. A predetermined period of time may be one hour, one day, one week or another period of time based on, for example, the time needed to meet the throughput of matching queries with a unique identifier meeting the predetermined number of users. The predetermined values described herein can thus be adjusted based on the throughput of queries and sensitivity level desired by an advertising sponsor or the advertising network as a whole.

Certain features that are described in this description in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims.

What is claimed is:

1. A computer-implemented method comprising:
receiving, by at least one processor and from a sponsor of an advertisement, a request for search query information for an advertisement that has been presented by a search service, the request including data specifying a length of time for which the sponsor is requesting search query information;
identifying, by at least one processor, previously executed privacy safe search queries that match one or more keywords specified by the sponsor of the advertisement, and that were submitted by users of the search service, wherein each of the identified previously executed privacy safe search queries is a search query that was received from at least a predetermined number of unique users over the specified length of time, the predetermined number of unique users being at least equal to a popularity threshold that specifies a minimum number of unique users from which a search query is required to be received for the search query to be deemed privacy safe, and wherein search results responsive to the identified privacy safe search queries have been presented along with the advertisement to one or more users of the search service;
compiling, by at least one processor, search query information, the search query information including ad performance data based on user interaction with the advertisement when presented with the search results for the identified search queries; and
providing, by at least one processor, the sponsor with the compiled search query information.

2. The method of claim 1 wherein each unique user from which a particular search query is received is represented by a unique identifier that is associated with the particular search query.

3. The method of claim 1 wherein:
compiling search query information further comprises compiling the ad performance data for at least one of a query match type comprising at least one of
an exact match, wherein an entered search query is identical to a key word used to invoke presentation of an advertisement,
a phrase match, wherein a portion of the entered search query is identical to the key word used to invoke presentation of the advertisement, and
a broad match, wherein the entered search query triggers an advertisement having similar content to that of the key word used to invoke presentation of the advertisement.

4. The method of claim 1 wherein the identified search queries trigger a display of the advertisement.

5. The method of claim 1 wherein the identified search queries are associated with a click of the advertisement.

6. The method of claim 1 further comprising receiving a request from the sponsor of the advertisement to modify a set of keywords used to invoke presentation of the advertisement conditioned upon the compiled search query information.

7. The method of claim 6 wherein the request comprises a request to add one or more of the identified search queries to the set of keywords.

8. The method of claim 6 wherein the request comprises a request to delete one or more of the set of keywords based on the identified search queries.

9. An apparatus comprising a computer program stored on a computer readable storage medium, the stored computer program including executable instructions causing a computing device to perform functions comprising:
receiving, from a sponsor of an advertisement, a request for search query information relating to the advertisement having been presented by a search service, the request including data representing a specified length of time for which the sponsor is requesting search query information;
identifying previously executed privacy safe search queries that match one or more keywords specified by the sponsor of the advertisement, and that were submitted by users of the search service, wherein each of the identified previously executed privacy safe search queries is a search query that was received from at least a predetermined number of unique users over the specified length of time, the predetermined number of unique users being at least equal to a popularity threshold that specifies a minimum number of unique users from which a search query is required to be received for the search query to be deemed privacy safe, and wherein search results responsive to the identified privacy safe search queries have been presented along with the advertisement to one or more users of the search service;
compiling search query information, the search query information including ad performance data based on user interaction with the advertisement when presented with the search results for the identified search queries; and
providing the sponsor with the compiled search query information.

10. A system comprising:
a data processing apparatus including at least one processor;
means for receiving, from a sponsor of an advertisement, a request for search query information relating to the advertisement having been presented by a search service, the request including data representing a specified length of time for which the sponsor is requesting search query information;
means for identifying previously executed privacy safe search queries that match one or more keywords specified by the sponsor of the advertisement, and that were submitted by users of the search service, wherein each of the identified previously executed privacy safe search queries is a search query that was received from at least a predetermined number of unique users over the specified length of time, the predetermined number of unique users being at least equal to a popularity threshold that specifies a minimum number of unique users from which a search query is required to be received for the search query to be deemed privacy safe, and wherein search results responsive to the identified privacy safe search queries have been presented along with the advertisement to one or more users of the search service;
means for compiling the search query information, the search query information including ad performance data based on user interaction with the advertisement when presented with the search results for the identified search queries; and
means for providing the sponsor with the compiled search query information.

11. A system comprising:
a user interface configurable to receive, from a sponsor of an advertisement, a request for search query information relating to the advertisement having been presented by a search service; and
a query management module including at least one processor configured to:
  access previously executed privacy safe search queries comprising search queries submitted to a search service by at least a predetermined number of unique users over a predetermined length of time, wherein each of the previously executed privacy safe search queries matches one or more keywords specified by the sponsor of the advertisement, and wherein the predetermined number of unique users is at least equal to a popularity threshold that specifies a minimum number of unique users from which a search query is required to be received for the search query to be deemed privacy safe;
  compile search query information, the search query information including ad performance data based on user interaction with the advertisement when presented with the search results for the previously executed search queries; and
  provide the sponsor with the compiled search query information.

12. The system of claim 11 wherein the query management module is configured to categorize the search queries into a query match type comprising at least one of an exact match, wherein an entered search query is identical to a key word used to invoke presentation of an advertisement, a phrase match, wherein a portion of the entered search query is identical to the key word used to invoke presentation of the advertisement, or a broad match, wherein the entered search query triggers an advertisement having similar content to that of the key word used to invoke presentation of the advertisement.

13. The system of claim 11 wherein the previously executed search queries are associated with a click of the advertisement.

14. The system of claim 11 wherein each unique user from which a particular search query is received is represented by a unique identifier that is associated with the particular search query.

15. The system of claim 11 wherein the query management module is configured to receive a request from the sponsor of the advertisement to modify a set of keywords used to invoke presentation of the advertisement conditioned upon the compiled search query information.

16. A computer-implemented method, comprising:
receiving, by at least one processor and from a sponsor of an advertisement, a request for search query information relating to the advertisement having been presented by a search service, the request including data representing a specified length of time for which the sponsor is requesting search query information;
identifying, by at least one processor, previously executed search queries submitted by users of the search service, wherein search results of the identified search queries have been presented with the advertisement to one or more users of the search service, the identified search queries matching one or more keywords specified by the sponsor for the advertisement, and each previously executed search query having a corresponding unique user identifier that represents a user that submitted the previously search query;
for each of the previously executed search queries, determining, by at least one processor, a number of different unique user identifiers that correspond to the previously executed search query over the specified length of time, wherein the number of different unique user identifiers that correspond to a particular search query represent a number of different users that submitted the particular search query over the specified length of time;
selecting, as privacy-safe queries, previously executed search queries that have been received from at least a predetermined number of unique users over the specified length of time, wherein each unique user is represented by a different unique user identifier, and wherein the predetermined number of unique users is specified by a popularity threshold that specifies a minimum number of unique users from which a search query is required to be received for the search query to qualify as a privacy safe search query, and
compiling, by at least one processor, search query information for the privacy-safe queries, the search query information including ad performance data based on user interaction with the advertisement when presented with the search results for the privacy-safe queries; and
providing, by at least one processor, the sponsor with the compiled search query information.

* * * * *